Patented Mar. 12, 1935

1,994,264

UNITED STATES PATENT OFFICE 1,994,264

PROCESS FOR DETERMINING THE SOLIDS CONTENT OF EGGS

Willis H. Atkinson, Chicago, Ill.

No Drawing. Application February 17, 1934, Serial No. 711,728

3 Claims. (Cl. 23—230)

This invention relates to an improved method of determining the total solids content of protein-containing materials, and more particularly to an improved method of determining the total solids content of eggs and their composite parts.

Heretofore the solids content of liquid eggs has been ascertained by dehydrating a certain quantity by weight in an electric oven, and computing the residue as total solids. The time required for conducting this test renders it impractical for testing liquid eggs which are to be frozen. Other methods heretofore tried have proven objectionable not only because of the time required for performing them but because of decomposition of part of the material being tested and consequent inaccurate results.

Eggs must be frozen promptly after the shells are broken in order to prevent bacterial contamination. Where pure food laws and regulations require frozen liquid eggs to be of certain standard as to minimum solids content, the producer of frozen eggs, in order to avoid solids insufficiency, has been obliged to provide an excess of solids for the reason that solids shortage cannot be corrected by the addition of yokes after the liquid eggs have been subjected to refrigeration, and, prior to my invention, no method was known whereby the solids could be determined in the time available between breaking and refrigeration of the eggs.

The main object of my invention, therefore, is to provide a dependable method for quickly determining the solids content of protein-containing materials, and, more particularly, a method whereby the solids content of eggs and their composite parts may be accurately determined in the period properly permitted to intervene between breaking of the eggs and subjecting the same to refrigeration. Another object is to accomplish the desired purpose without decomposition of the material to be tested.

My method for determining the solids content of eggs permits producers of frozen liquid eggs to adjust the solids content of eggs containing insufficient solids to the required amount by addition of yokes, before the liquid eggs are subjected to refrigeration, thus producing a standardized product and saving the cost of excess solids.

One of the advantages of this method over the method in which I used a non-volatile precipitating agent which precipitated proteins and fat, is that the total solids can be calculated accurately without allowing for any added chemicals which formerly combined with the protein precipitate.

My method comprises the step of precipitating the protein matter in protein-containing material by means of a volatile precipitating agent, one which is one hundred percent volatile. Volatile organic oxides, of which ether is an example, volatile aldehydes, such as formaldehyde, any volatile alcohol such as isopropyl alcohol or denatured alcohol U. S. #30, and volatile ketones such as acetone, may be used.

For example, to a 10 gram specimen of egg to be tested, I add 100 c. c. of the chosen reagent, mix by shaking vigorously to form granular particles, small enough to filter rapidly and dry quickly. The mixture may be filtered by means of a vacuum filter or any other apparatus by which the supernatant liquid is extracted in a minimum period of time. Only thirty seconds or less is required for filtration. The reagent functions as a precipitating agent for the proteins and as a solvent for other of the solid constituents. The precipitate is dried at temperatures low enough to avoid decomposition.

The supernatant liquid or filtrate is also preserved and while the precipitate is drying, I take from the filtrate an aliquot part of the filtrate and dry it. For example, if I have 100 c. c. of filtrate I may dry 10 c. c. of it, which will dry much faster than a larger quantity, and I then multiply the weight of the residue in the aliquot part of the filtrate by 10 to obtain the total solids in the filtrate. By adding the weight of the precipitate to the weight of the residue of the filtrate, I determine the total solid material in the specimen.

The time required for the whole process is not more than fifteen minutes. The fact that my process can be performed in such a short period of time is the factor which renders it practical for determining the solids content of eggs between the time they are broken and subjected to refrigeration, thus permitting adjustment of solids content by addition of yokes in case the solids content of whole eggs is lower than desired.

The treatment herein described renders insoluble the protein matter in the liquid eggs and the egg solids become efflorescent and give up water readily. These fundamental changes in the characteristics of egg proteins make it possible to quickly and accurately determine the solids content of eggs. This process is not to be confused with precipitation processes for the purpose of recovering protein matter from fluids, for in the latter it is important to avoid altering the protein characteristics and, therefore, my process is not useful for recovering egg proteins.

I claim:—

1. A process for rapidly determining the solids content of liquid eggs, which comprises adding a completely volatile organic protein precipitating agent such as volatile aliphatic ethers, alcohols, aldehydes and ketones to a weighed sample of the eggs, precipitating the protein, rapidly filtering the mixture, drying the protein precipitate at temperatures low enough to avoid decomposition, drying an aliquot part of the filtrate, and separately weighing the precipitate and the residue of the dried filtrate.

2. A process for rapidly determining the solids content of liquid eggs, which comprises adding a completely volatile organic protein precipitating agent, such as volatile aliphatic alcohols, to a weighed sample of the eggs, precipitating the protein, rapidly filtering the mixture, drying the protein precipitate at temperatures low enough to avoid decomposition, drying an aliquot part of the filtrate, and separately weighing the precipitate and the residue of the dried filtrate.

3. A process for rapidly determining the solids content of liquid eggs, which comprises adding a completely volatile organic protein precipitating agent, such as volatile aliphatic ketones, to a weighed sample of the eggs, precipitating the protein, rapidly filtering the mixture, drying the protein precipitate at temperatures low enough to avoid decomposition, drying an aliquot part of the filtrate, and separately weighing the precipitate and the residue of the dried filtrate.

WILLIS H. ATKINSON.